UNITED STATES PATENT OFFICE.

JACOB REESE, OF PITTSBURG, PENNSYLVANIA.

CRYSTALLINE CALCIC TETRAPHOSPHATE AND THE PROCESS OF MAKING THE SAME.

SPECIFICATION forming part of Letters Patent No. 412,792, dated October 15, 1889.

Application filed September 23, 1887. Serial No. 250,479. (No specimens.)

*To all whom it may concern:*

Be it known that I, JACOB REESE, a citizen of the United States, residing at Pittsburg, in the county of Allegheny and State of Pennsylvania, have invented a new and useful Improvement in Phosphates; and I hereby declare the following to be a full, clear, and exact description thereof.

This invention relates to that class of chemical compounds known as "calcium phosphates."

Heretofore only three different compounds of calcium phosphates were known to commerce—namely, the monobasic calcium phosphate, the formula being $CaOP_2O_5$; the bibasic calcium phosphate, $2CaOP_2O_5$, and the tribasic calcium phosphate, $3CaOP_2O_5$.

I have discovered that when phosphorus is oxidized at a high temperature in the presence of lime a tetrabasic calcium phosphate is formed, the formula being $4CaOP_2O_5$. I have discovered that this tetrabasic calcium phosphate is an excellent fertilizer, is easily assimilated by growing crops, and is good for food and medicine.

This invention consists in the production of a crystallized tetrabasic calcium phosphate, and also in pulverizing the same.

This crystallized tetrabasic phosphate may be formed from a basic calcareous compound produced by melting scrap-iron and phosphorus in a cupola or other furnace, and thus producing an iron and phosphorus compound, then oxidizing this compound at a temperature sufficiently high to keep the compound in a fused state while in the presence of lime, until the phosphorus is deposited and held in the lime as a phosphate; or non-phosphoritic iron ores may be smelted in a blast-furnace, together with phosphate of lime, Charleston rock, phosphate nodules, bones, oyster-shells, or apatite, and thus forming a metal high in phosphorus, then oxidizing the phosphorus while the metal is held in a molten state in the presence of lime; or phosphoritic iron ores may be smelted in a blast-furnace, then the molten metal blowing with an air-blast while in a molten state in a metal-lined water-jacketed vessel and in the presence of lime, until the phosphorus is oxidized and held in the lime.

I do not herein claim any peculiar form of furnace, nor any special ore or article from which to obtain the phosphorus, as this invention is confined to the production of a crystallized tetrabasic phosphate of lime.

In the formation of the phosphate by either of the methods described other material will be present in the compound, such as silica, alumina, oxide of iron, and lime. Now, in order to secure the phosphate in the more highly crystallized and purer condition contemplated by my invention, so that it may readily be distinguished and separated from the accompanying foreign matter, I pour the phosphate while in a highly-heated state into a mold or receptacle and surround it with a non-conducting substance, and thus anneal it, or, in other words, continue its cooling operation for from three to five days. By thus treating the material the tetrabasic crystals will assemble in the center of the mass, and can be readily distinguished and separated from the other matter. These crystals are flat square in form and of a faint yellowish color. When these crystals are carefully separated from all other matter and pulverized, they may be used for food or medicinal purposes.

In the manufacture of the material from which the tetrabasic phosphate of lime is produced an excess of lime should always be provided in order that any silica present will form silicates of lime, and that there will be sufficient lime after the silicates are found to furnish the base for the $4CaOP_2O_5$. The proportion of tetrabasic phosphate in the lime when withdrawn will depend on the amount of lime charged and the amount of phosphorus oxidized. I prefer that the lime when so charged shall contain not less than forty per cent. nor more than eighty per cent. of the tetrabasic phosphate.

What I claim as my invention, and desire to secure by Letters Patent, is—

1. The process for the manufacture of crystallized tetrabasic phosphate of lime, which consists in oxidizing phosphorus at a high temperature while in the presence of lime, until the lime is charged with phosphoric acid, then withdrawing the charged lime and subjecting it to slow cooling, substantially as described.

2. As a new article of manufacture, crystallized tetrabasic phosphate of lime.

3. As a new article of manufacture, pulverized crystals of tetrabasic phosphate of lime.

JACOB REESE.

Witnesses:
    WALTER REESE,
    C. C. LEE.